United States Patent [19]
Moore et al.

[11] Patent Number: 6,075,989
[45] Date of Patent: Jun. 13, 2000

[54] METHOD AND APPARATUS FOR DETERMINING A NEED TO HANDOFF A MOBILE COMMUNICATION SIGNAL IN A WIRELESS COMMUNICATION SYSTEM

[75] Inventors: Jay B. Moore, Keller; Jon Quin St. Clair, Bedford, both of Tex.

[73] Assignee: Motorola, Inc., Schaumburg, Ill.

[21] Appl. No.: 09/009,291

[22] Filed: Jan. 20, 1998

[51] Int. Cl.[7] .................................................. H04Q 7/20
[52] U.S. Cl. ............................................ 455/436; 455/437
[58] Field of Search .................................. 455/423, 434, 455/436, 437, 438, 452

[56] References Cited

U.S. PATENT DOCUMENTS

| | | | |
|---|---|---|---|
| 5,309,503 | 5/1994 | Bruckert et al. | 455/452 |
| 5,432,843 | 7/1995 | Bonta | 455/438 |
| 5,710,974 | 1/1998 | Granlund et al. | 455/63 |
| 5,848,063 | 12/1998 | Weaver, Jr. et al. | 455/436 |
| 5,917,811 | 6/1999 | Weaver, Jr. et al. | 455/437 |
| 5,920,549 | 7/1999 | Bruckert et al. | 455/436 |

*Primary Examiner*—Daniel S. Hunter
*Assistant Examiner*—Myron K. Wyche
*Attorney, Agent, or Firm*—Richard A. Sonnentag; Mario J. Donato, Jr.

[57] ABSTRACT

In a wireless communication system, which includes a first base site (101) having an associated controller (130) and a second base site (108), a mobile station (103) responsive to the first and second base site, a method for determining a need to hard handoff a mobile communication signal (107) associated with the mobile station from the first base site to the second base site is disclosed. The method includes receiving a plurality of hard handoff candidate parameters associated with the mobile communication signal, and then measuring a plurality of scan result parameters associated with the mobile communication signal by a handoff scan receiver (304). The method further includes forwarding the plurality of scan result parameters to the controller, and then determining whether or not a hard handoff of the mobile communication signal is required based on the scan result parameters.

20 Claims, 4 Drawing Sheets

METHOD AND APPARATUS FOR DETERMINING A NEED TO HANDOFF A MOBILE COMMUNICATION SIGNAL IN A WIRELESS COMMUNICATION SYSTEM

FIELD OF THE INVENTION

The present invention relates generally to wireless communication systems and, more particularly, to a method and apparatus for determining a need to hard handoff a mobile communication signal from a first communication unit to a second communication unit in a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95A (TIA/EIA IS-95A) herein after referred to as IS-95A. In accordance with IS-95A, the coded communication signals used in the DS-CDMA system comprise signals that are transmitted in a common 1.25 MHz bandwidth, hence, spread-spectrum, to base sites of the system from communication units, such as mobile or portable radiotelephones, that are communicating in the coverage areas of the base sites. Each 1.25 MHz bandwidth portion of the radio-frequency (RF) spectrum is commonly referred to as a carrier frequency or channel.

In a cellular communication system, a communication link via an RF channel is established between a mobile station, or subscriber, and a source base transceiver station. As a mobile station moves out of range of the source base transceiver station, the signal quality degrades until the communication link is ultimately broken, or the call "dropped". To avoid loss of the communication link resulting from a dropped call, the communication link is shifted from the source base transceiver station to a target base transceiver station, or from a source sector to a target sector within the source base transceiver station coverage area. This process of making the shift is commonly referred to in the cellular communication area as a handoff process.

A handoff can be defined as a change of channel or a change of switch control during a call, either because of degradation of the quality of the RF channel which includes, power level or communication link quality below a certain threshold, or because of the availability of another channel which can allow communication at a lower transmit power, or to prevent a mobile station from grossly exceeding the planned base station boundaries. A handoff may occur during a call in progress (e.g. from a traffic channel to a traffic channel), or during the initial signaling during call set-up.

Handoffs are generally classified into three types; a soft handoff, a softer handoff and a hard handoff. A soft handoff occurs when a mobile communication signal is transferred from a source base transceiver station (BTS) to a target BTS, both BTSs associated with the same base station controller but serving different cell coverage areas. A softer handoff occurs when a mobile communication signal is transferred from a source sector to a target sector, both sectors associated with the same base transceiver station. During a soft and softer handoff, the mobile communication signal is supported simultaneously by both the source and target until the transfer to the target is complete.

A hard handoff occurs when a mobile station is directed to re-tune to a new carrier frequency, and/or the control of resources supporting the mobile communication signal is transferred from a source base station controller, herein referred to as a source central base station controller (CBSC) to a target CBSC. The transfer of a mobile communication signal from a source CBSC to a target CBSC may occur as an inter-CBSC transfer or a inter-system transfer which includes a transfer from a wireless digital communication system to a wireless analog communication system. A hard handoff may occur as an intra-CBSC transfer of a mobile communication signal from a first carrier frequency to a second carrier frequency, if the CBSC has been configured to support more than one carrier frequency.

In digital cellular systems—such as time division multiple access (TDMA) and code division multiple access (CDMA) systems, hard handoffs are generally initiated by a mobile station based on measurements of local pilot signals emanating from neighboring BTSs, wherein each pilot signal has an associated PN offset and represents a specific sector in a BTS coverage area. In CDMA systems, when the energy (Ec/Io) of a pilot signal measurement reaches a threshold, the mobile station initiates a handoff via a pilot strength measurement message (PSMM) sent to the source CBSC, the message containing the pilot signal strength energy measurement. Upon receipt of the PSMM, the source CBSC determines via a database parameter table that a hard handoff is required. The source CBSC then generates a handoff direction message to the target CBSC. The target CBSC allocates target channel resources including the target BTS and sector. The target BTS is also notified of the particular pn long code associated with the mobile station requesting the handoff via the mobile stations electronic serial number (ESN). The source CBSC then sends a handoff direction message to the mobile station. Upon receipt of the handoff direction message, the mobile station retunes to the new pn offset associated with the new target carrier frequency. The target base station then sends a handoff complete message to the target CBSC when its receiver locks onto the mobile station communication signal.

In any type of handoff, the mobile station can recognize only those PN offsets of base station sectors operating within its same carrier frequency. As a result, a mobile communication signal hard handoff from one carrier frequency to another carrier frequency may be initiated by a mobile station upon receipt by the mobile station of a pilot signal from a pilot beacon transmitter. The pilot beacon transmitter facilitates mobile station communication signal hard handoff (i.e. from a first carrier frequency associated with a source BTS sector to a second carrier frequency associated with a target BTS sector) by transmitting a pilot signal on the carrier frequency of the source BTS sector. Since the pilot beacon transmitter operates at a lower power than the BTS sector in which it is co-located, it provides a pilot signal for acquisition by a mobile station entering its coverage area. Upon acquisition of the pilot beacon signal by the mobile station, a PSMM containing the pilot signal energy measurement sent to the source CSBS triggers the appropriate hard handoff sequence.

In congested urban areas where multiple carrier frequencies are utilized, numerous hard handoff seams are created. BTS sectors bordering hard handoff seams require a pilot beacon transmitter to be colocated in each individual BTS sector in order to facilitate mobile station hard handoffs. Consequently, it is conceivable that a BTS sector bordering a hard handoff seam may have as many as ten pilot beacon transmitters, each transmitting on different carrier frequencies. This pilot beacon approach becomes immediately costly in systems with more than three carriers. In addition to hardware costs, many outdoor base stations have very limited space for accessories and have very limited reserves for accessory power consumption and heat dissipation.

Therefore, a need exists for an improved method for determining the necessity of, and facilitating a hard handoff of a mobile station communication signal from a first communication unit, or source base station, to a second communication unit, or target base station, in a wireless communication system.

DETAILED DESCRIPTION OF THE PREFERRED EMBODIMENT

Stated generally, the present invention encompasses a method for determining a need to handoff a mobile communication signal associated with a mobile station in a wireless communication system, which includes a first base site having an associated controller, and a second base site, and a mobile station responsive to the first and second base site. The method includes establishing the communication signal between the first communication unit and the mobile station. The method further includes receiving a plurality of hard handoff candidate parameters associated with the mobile communication signal at a handoff scan receiver, and subsequently measuring a plurality of scan result parameters associated with the mobile communication signal by the handoff scan receiver. The method also includes forwarding the plurality of scan result parameters to the controller, and then determining whether or not a hard handoff of the mobile communication signal is required based on the scan result parameters.

The handoff scan receiver includes an antenna, a front end processor, a channel element processor, and a local scan controller. The handoff scan reciever scans each of the carrier frequencies in search of a particular mobile station unique long code and other parameters associated with a mobile station determined to be a hard handoff candidate. Based on the parameters, the scan reciver forwards the parameters to a CBSC serving the hard handoff candidate mobile station, who may then chose to initiate a hard handoff of the mobile communication signal associated with the particular hard handoff candidate mobile station.

Figure 1:
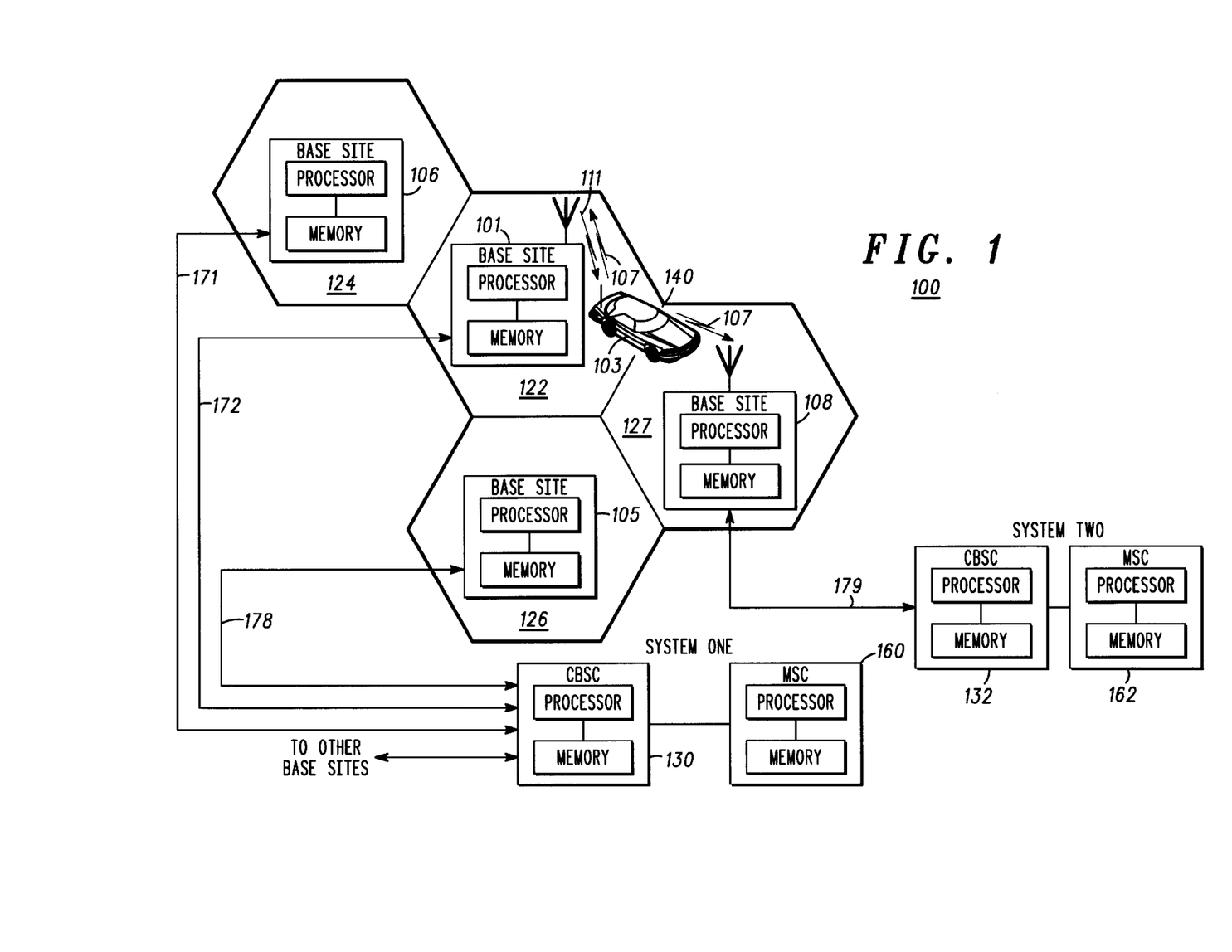
FIG. 1 is a block diagram of a prior art typical wireless communication system.

Turning now to the drawings, wherein like numerals designate like components, FIG. 1 illustrates a typical prior art wireless communication system 100. Wireless communication system 100 preferably comprises a direct sequence code division multiple access (DS-CDMA) cellular communication system, such as that set forth in the Telecommunications Industry Association Interim Standard 95A (TIA IS-95A).

Communication system 100 includes base sites 101, 105, 106 and 108 associated with coverage areas 122, 126, 124, and 127 respectively. Communication system 100 also includes one or more mobile stations although only one mobile station 103 is shown. Base sites 101, 105, 106, and 108 include, among other things, a processor 140 and a memory 150. Each base site preferably includes a RAKE receiver that receives coded communication signals from mobile stations traveling, and a transmitter (discussed further below) that transmits coded communication signals to mobile stations traveling within its coverage area.

Base sites 101, 105, and 106 are coupled to a first central base station controller (CBSC) 130 via BTS links 172, 178, and 171 respectively. CBSC 130 includes, among other things, a processor 140 and a memory 150, and which is in turn coupled to a mobile switching center (MSC) 160, also including a processor 140 and a memory 150. Base site 108 is coupled to a second CBSC 132 via BTS link 179. CBSC 132 includes, among other things, a processor 140 and a memory 150, and which is in turn is coupled to a MSC 162, also including a processor 140 and a memory 150. MSCs 160 and 162 are coupled to the public switched telephone network (not shown) using known techniques.

Signals 107 and 111 are conveyed between mobile unit 103 and base site 101 through a radio frequency (RF) channel. The RF channel includes a reverse link signal 107 (mobile unit 103 to base site 101) and a forward link signal 111 (base site 101 to mobile unit). Communication signals 107 and 111 include a pseudo-random binary code or initial state pseudo-random long code (not shown) associated with and assigned by base site 101, and an identification code or mobile unique pseudo-random long code mask (not shown). This results in a mobile station unique long code associated exclusively with mobile station 103. The mobile station unique long code is subsequently used by a base site RAKE receiver to identify a particular mobile station transmission.

Figure 2:
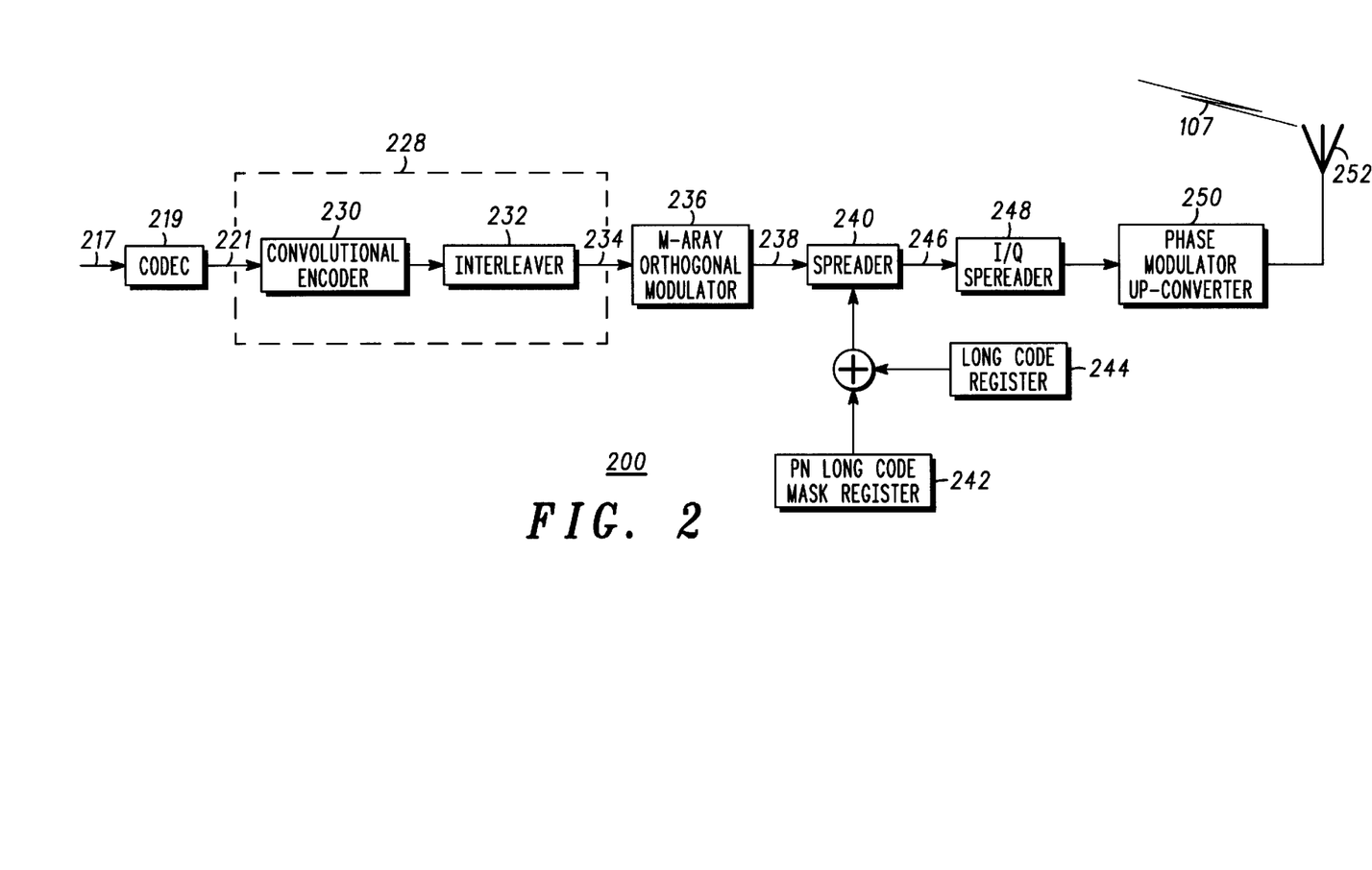
FIG. 2 is a block diagram of a transmitter for use in a mobile station for generating communication signal.

FIG. 2 is a block diagram of a transmitter 200, for use in a mobile station such as mobile station 103, for generating communication signal 107. A data bit stream 217, which may be voice, video or another type of information, enters a variable-rate coder 219, which produces a signal 221 comprised of a series of transmit channel frames having varying transmit data rates. The data rate of each frame depends on the characteristics of data bit stream 217.

Encoder block 228 includes a convolutional encoder 230 and an interleaver 232. At convolutional encoder 230, the transmit channel frame may be encoded by a rate ⅓ encoder using well known algorithms such as convolutional encoding algorithms which facilitate subsequent decoding of the frames. Interleaver 232 operates to shuffle the contents of the frames using commonly known techniques such as block interleaving techniques.

Each frame 234 of digitally coded and interleaved bits includes ninety-six groups of six coded bits, for a total of 576 bits. Each group of six coded bits represents an index (not shown) to one of sixty-four symbols such as Walsh code symbols. A Walsh code symbol corresponds to a single row or column of a sixty-four-by-sixty-four Hadamard matrix, a square matrix of bits with a dimension that is a power of two. Typically, the bits comprising a Walsh code symbol are referred to as Walsh chips.

Each of the ninety-six Walsh code indices in frame 234 are input to an M-ary orthogonal modulator 236, which is preferably a sixty-four-ary orthogonal modulator. For each input Walsh code index 235, M-ary orthogonal modulator 236 generates, at output 238, a corresponding sixty-four-chip Walsh symbol W 239. Thus, a series of ninety-six, sixty-four-chip Walsh symbols W 239 are generated for each frame 234 input to M-ary orthogonal modulator 236 and are based on the input bit stream.

Spreader block 240, among other things, applies a pseudo-random noise (PN) sequence to the series of Walsh codes W 239 using well-known scrambling techniques. Typically, in DS-CDMA, spreader block 240 spreads the series of Walsh symbols using a mobile unique PN sequence. The mobile unique PN sequence is the result of the sum of the mobile unique pseudo-random long code mask generated by a PN long code mask register 242, and an initial state pseudo-random long code generated by long code register 244, the initial state pseudo-random long code determined by a Global Position Satellite (GPS) system (not shown) and initiated by the base site. Upon receipt of mobile transmitted signal 107, the base site uses the mobile unique PN sequence as a mobile identifier (discussed further below).

At block 248, the scrambled series of sixty-four-chip Walsh symbols 246 is a phase modulated using an offset quaternary phase-shift keying (OQPSK) modulation process or another modulation process. The resulting signal is then up-converted by an up-converter 250 and transmitted as communication signal S(T) 107 from antenna 252.

Returning to FIG. 1, a border defined by base site coverage areas served by adjacent CBSCs is commonly referred to as a hard handoff seam. The base site coverage areas which define the borders of the hard handoff seams are commonly referred to as border base sites. For example, base sites 101 and 105 coupled to CSBS 130 are considered border base sites as a portion of their coverage areas define a border of a hard handoff seam 140. Likewise, base site 108 coupled to CBSC 132 is a border base site as a portion of its coverage area defines a border of hard handoff seam 140.

A need for a hard handoff of a mobile communication signal exists when a mobile station, such as mobile station 103, is transmitting and receiving on a carrier frequency which is not supported by the target base site. This may be due to numerous configuration changes such as a reduction in the number of, or reallocation of carrier frequencies across the hard handoff seam. The need for a hard handoff of a mobile communication signal also exists between wireless communication systems run by different operators and for other reasons such as the need to dodge incumbent backhaul system operators which have not been cleared from the allocation RF spectrum space.

In one typical arrangement, base sites such as base sites 101 and 105 which define one side of hard handoff seam 140 operate on a first channel, while base sites such as base site 108 on the other side of hard handoff seam 140 operate on a second channel. A hard handoff of a mobile communication signal from the first channel to the second channel is initiated when the mobile station acquires a pilot beacon signal from a pilot beacon co-located at a border target base site such as base site 108. Although the pilot beacon is co-located within base site 108 which is associated with the second channel, it produces a low power transmission operating on the first channel. This arrangement allows the mobile station to acquire the pilot beacon while minimizing same channel frequency interference during a hard handoff of a mobile station communication signal.

A more complex arrangement of carrier frequencies may be required to allow hard handoffs of mobile communication signals in a congested urban area. Such an arrangement may necessitate a multicarrier capability in each CBSC, thus exposing a mobile station to numerous hard handoff seams as it travels from a source base site with a carrier frequency set which is different or greater than a carrier frequency set of the target base site.

For example, a first CBSC may support operation of six channels, or carrier frequencies, deployed in three sectors per base site yielding numerous hard handoff seams within a six sector coverage area, depending on adjacent carrier configurations. An adjacent lower capacity base site, which may or may not be supported by the first CBSC, such as a base site covering a highway on the outskirts of town or a subway tunnel may utilize, for example, two channels deployed in three sectors per base site. Even though the lower capacity base site has only two carriers, it must provide pilot beacon transmitters for all neighboring carriers. Thus, the lower capacity base site will require the burden of at least 4 pilot beacons broadcasting to local mobile stations in order to support all hard handoff possibilities.

Figure 5:
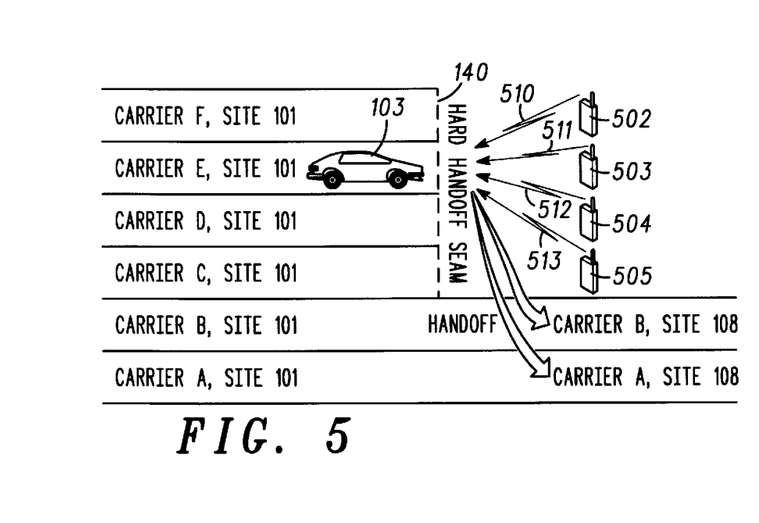
FIG. 5 illustrates an example of a multi-carrier arrangement of carrier frequencies in the typical wireless communication system shown in FIG. 1.

FIG. 5 illustrates an example of a multi-carrier arrangement of carrier frequencies in the typical wireless communication system shown in FIG. 1. As shown, base site 101 supports carrier frequencies A-F respectively, and may be assumed to encompass three sector areas. Generally, a base site may also encompass other sector arrangements. An adjacent lower capacity base site, base site 108, supports carrier frequencies A and B respectively and may be assumed to encompass three sector areas. A set of four pilot beacons 502–505 transmitting pilot signals 510–513 on carrier frequencies C-F respectively, and are colocated at base site 108 on one or more base site sectors facing the hard handoff seam. Base site 101 and 108 are border base sites, such that their boundaries define a hard handoff seam 140.

As a mobile station 103, operating on carrier frequency E, travels from base site 101 to base site 108 and crosses hard handoff seam 140, it must acquire pilot signal 511, in order to initiate a hard handoff sequence of a mobile station communication signal 107 to either carrier frequency A or B. Similarly, if mobile station 103, operating on carrier frequency C, travels from base site 101 to base site 108 and crosses hard handoff seam 140, it must acquire pilot signal 513, in order to initiate a hard handoff sequence of mobile station communication signal 107 to either carrier frequency A or B. But, if mobile station 103, operating on carrier frequency B, travels from base site 101 to base site 108 and acquires a base site pilot signal on carrier frequency B, a soft handoff will be initiated. Accordingly, acquiring one of pilot signals 510–513 by mobile station 103, triggers a hard handoff when a pilot signal strength measurement reaches a predetermined threshold. Thus, 4 pilot beacon transmitters are required at base site 108 in order to support all hard handoff possibilities for mobile station 103.

Figure 3:
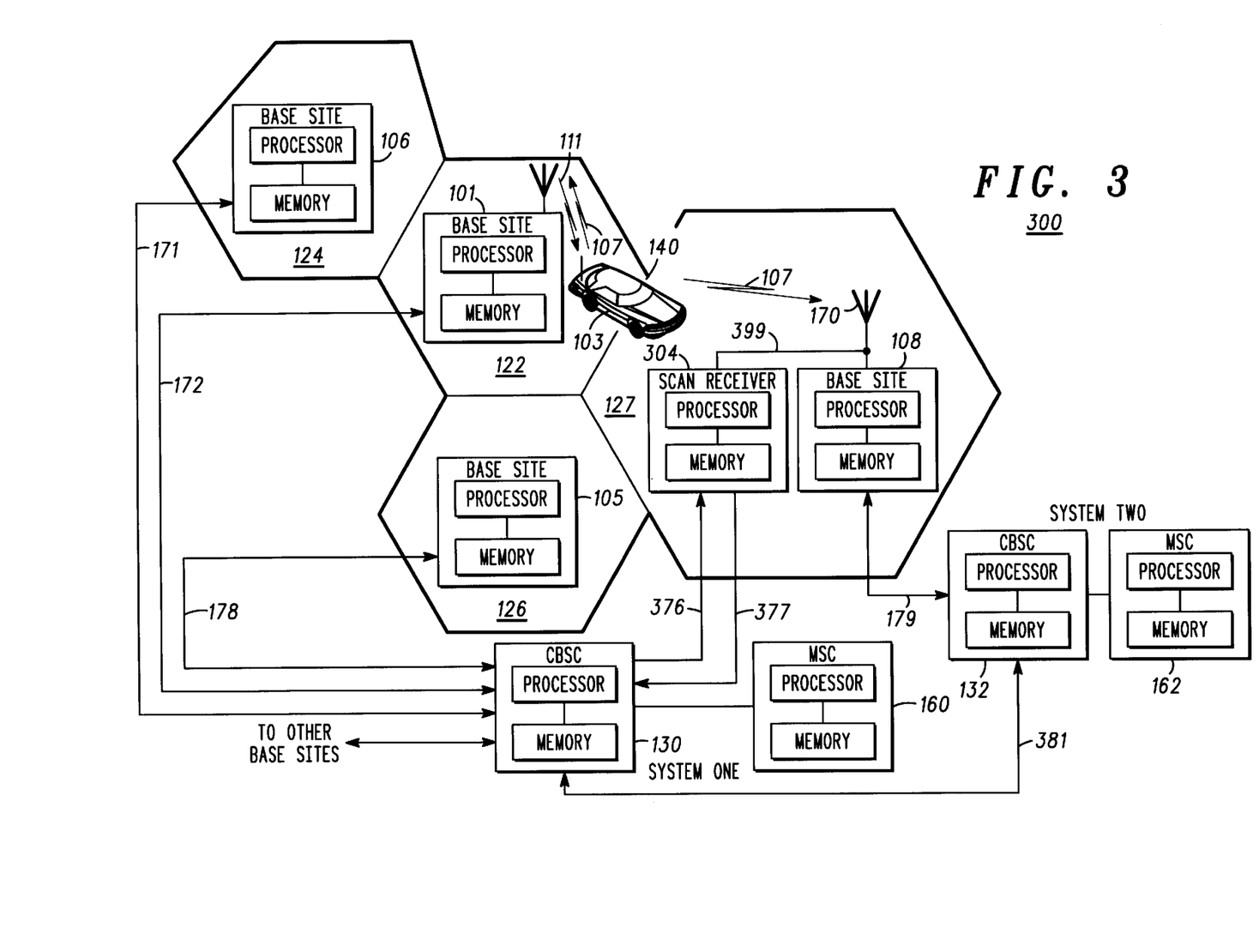
FIG. 3 depicts a wireless communication systems as shown in FIG. 1, further illustrating aspects of the preferred embodiment of the present invention.

FIG. 3 depicts a wireless communication system as shown in FIG. 1, further illustrating aspects of the preferred embodiment of the present invention. As shown, wireless communication system 100 is configured with a handoff scan receiver 304 to overcome the problem of multiple pilot beacon transmitter placement at border base sites, and may be generally designated as wireless communication system 300. Handoff scan receiver 304 is co-located with base site 108 and is configured to receive a scan receiver input 376 from CBSC 130 and provide a scan receiver output 377 to CBSC 130. Handoff scan receiver 304 is coupled to a receive antenna via coaxial link 399 at base site 108 in order to receive RF signals such as signal 107 from mobile station 103. In addition, a signaling trunk 381 is provided between CBSC 130 and CBSC 132. Handoff scan receiver 304 may be implemented using a modified RAKE receiver available from Motorola, Inc.

As mobile station 103, having established communication link 107 with base site 101, travels toward hard handoff seam 140, handoff scan receiver 304 serves to detect communication signal 107 and facilitate the need for a hard handoff, according to a preferred embodiment of the present invention as follows. First, handoff scan receiver collects hard handoff candidate parameters associated with all local mobile stations including mobile station 103. The hard handoff candidate parameters include mobile station unique long codes embedded in each mobile station ESN to facilitate mobile station identity, the carrier frequencies associated with all local mobile communication signals, and the candidate mobile station time delay intervals as measured between each mobile station and its serving, or source, base site. The hard handoff parameters are collected by local base sites, such as base sites 101 and 105 from local mobile stations and are then forwarded to handoff scan receiver 304 via scan receiver input 376. The local base sites forward a set of hard handoff candidate parameters associated a local mobile station, such as mobile station 103, when the time delay interval associated with the local mobile station increases to a value above a predetermined threshold.

Upon receipt of a set of hard handoff candidate parameters associated with mobile station 103, handoff scan receiver 304 adds mobile station 103 to a hard handoff candidate list. The carrier frequency associated with mobile station 103 is used by handoff scan receiver 304 to select the proper carrier frequency to scan for mobile communication signal 107. The mobile station unique long code associated with mobile station 103 is used by handoff scan receiver 304 to identify transmitted mobile communication signals from mobile station 103 amid all other signals being transmitted on the same carrier frequency.

Based on the hard handoff candidate list, scan receiver 304 begins scanning individual carrier frequencies, via antenna 170 through an RF link, for scan result parameters. The scan result parameters are collected by handoff scan receiver 304 based on mobile stations included on its hard handoff candidate list, such as mobile station 103. Handoff scan receiver 304 operates by tuning to an individual carrier frequency and despreading all incoming mobile communication signals in order to decode mobile station unique long codes associated with mobile stations on the hard handoff candidate list. Upon identifying a mobile communication signal associated with a mobile station on the hard handoff candidate list, for example mobile station 103, handoff scan receiver 304 measures a received signal strength indicator of mobile communication signal 107, and a time delay interval as measured between mobile station 103 and a candidate, or target, base station. Handoff scan receiver 304 then forwards the mobile station unique long code, the time delay, and received signal strength indicator associated with the hard handoff candidate, such as mobile station 103, to its serving CBSC, such as CBSC 130 via scan receiver output 377. The step of forwarding is initiated when the time delay interval associated with mobile station 103 decreases to a value below a predetermined threshold.

Next, CBSC 130 determines whether or not a hard handoff of mobile communication signal 107 is needed as follows. First, CBSC 130 compares the time delay interval received from handoff scan receiver 304, to a predetermined threshold forming a time delay index. Similarly, CBSC 130 compares the received signal strength indicator to a predetermined signal strength threshold forming a signal strength index. Based on the time delay index and the signal strength index, CBSC 130 notifies a target CBSC, such as CBSC 132 of the need to hard handoff mobile communication signal 107. Finally, CBSC 132 directs the allocation of channel resources to support the handoff of mobile communication signal 107 using well known methods and mobile station 103 is notified to handoff its communication signal.

Figure 6:
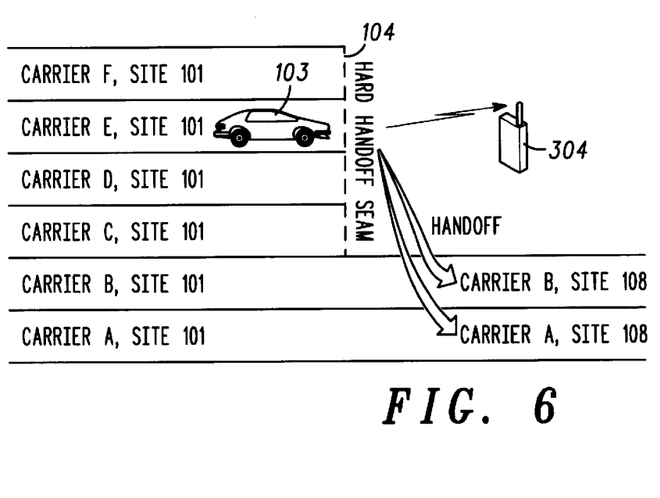
FIG. 6 illustrates the multi-carrier arrangement of carrier frequencies shown in FIG. 5, according to a preferred embodiment of the present invention.

FIG. 6 illustrates the multi-carrier arrangement of carrier frequencies shown in FIG. 5, according to a preferred embodiment of the present invention. As shown, FIG. 6. is substantially identical to FIG. 5 except pilot beacons 502–505 have been replaced by handoff scan receiver 304.

Figure 4:
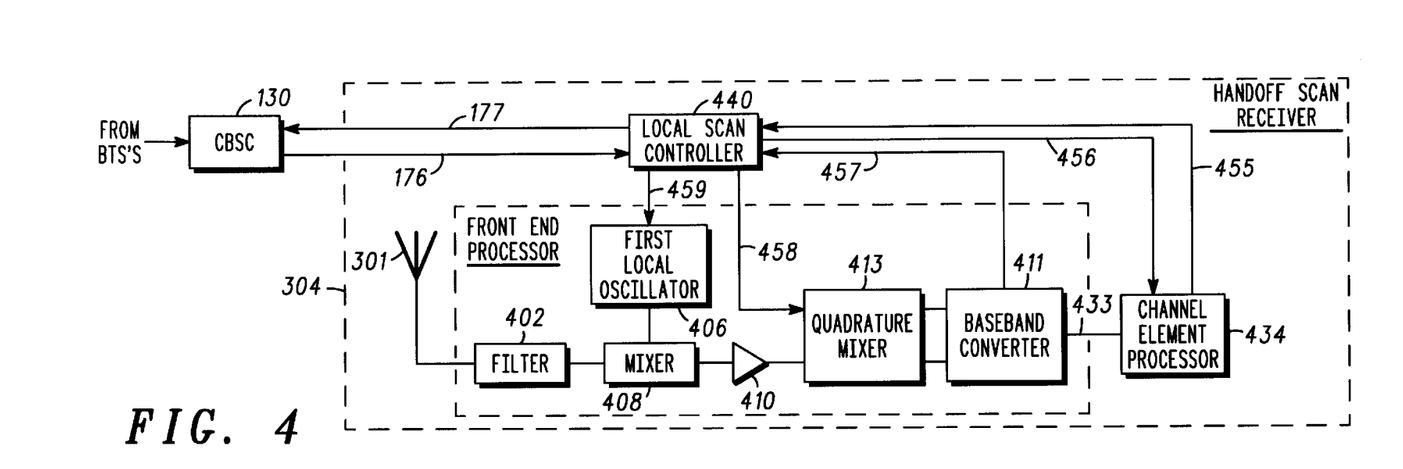
FIG. 4 is a partial block diagram of a handoff scan receiver used for determining a need for transferring the communication signal waveform generated by the transmitter depicted in FIG. 2.

FIG. 4 is a partial block diagram of handoff scan receiver 304 used for determining a need for transferring mobile communication signal 107 depicted in FIG. 3, according to a preferred embodiment of the present invention. Handoff scan receiver 304 includes an antenna 301. Antenna 301 receives local mobile station communication signals including mobile communication signal 107, as handoff scan receiver 304 tunes to, and scans each carrier frequency. A front end processor 412 tunes to each carrier frequency in response to a controller input 459 and second controller input 458 from a local scan controller 440 (discussed below). Front end processor 412 includes a filter 402 for bandpass noise filtering from the incoming mobile station communication signals and outputs a filtered analog signal. A first local oscillator (LO) 406, responsive to first controller input 459 provides a reference frequency output. A mixer 408 mixes the filtered analog signal with the reference frequency output to down-converting the frequency of the filtered analog signal and outputs an intermediate frequency analog signal. An amplifier adds gain and filters the intermediate frequency analog signal and outputs an amplified analog signal. Upon receipt of the amplified analog signal, a quadrature mixer 413 responsive to the second controller input splits the amplified analog signal into a first and second quadrature analog signal. Next, upon receipt of the first and second quadrature analog signal, a baseband converter 411, adjusts the gain of the first and second quadrature analog signals and provides a wideband signal strength measurement 457 to a local scan. In addition, analog-to-digital converters in baseband converter 411, converts the first and second quadrature analog signal to a digital signal 433 suitable for despreading by a channel element processor 434.

Channel element processor 434, having received a hard handoff candidate list from local scan controller 440 which includes hard handoff candidate parameters associated with mobile station 103, despreads digital signal 433 to identify a mobile station unique long code associated with mobile station 103. Once identified, channel element processor 434 forwards a signal strength indicator and a time delay associated with mobile station communication signal 107 to local scan controller via a processor output 455.

Local scan controller 440 initially receives hard handoff candidate parameter inputs including at least the hard handoff candidate parameters associated with mobile station 103 forwarded from base site 101 via CBSC 130. Based on the hard handoff candidate parameters, specifically the delay interval associated with mobile station 103, local scan controller 440 provides the hard handoff candidate list of the mobile station unique long codes including at least the mobile station unique long code associated with mobile station 103, to channel element processor 434. In response, channel element processor 434 forwards a received signal strength indicator and a time delay associated with mobile station 103 to local scan controller 440 via a processor output 455. Local scan controller 440 then compiles a list of scan result parameters. Based on a time delay interval associated with mobile station 103 included in the scan result parameters, local scan controller 440 forwards the scan result parameters to CBSC 130 via output 177. In addition to a time delay interval, the scan result parameters include the mobile station unique long code and the received signal strength indicator associated with mobile station 103. As discussed in connection with FIG. 3, CBSC 130 then determines whether or not a hard handoff of mobile station communication signal 107 is needed.

While the invention has been particularly shown and described with reference to a particular embodiment, it will be understood by those skilled in the art that various changes in form and details may be made therein without departing from the spirit and scope of the invention.

What we claim is:

1. In a wireless communication system, comprising a first communication unit having an associated controller, and a second communication unit, a mobile station responsive to the first communication unit and the second communication unit, a method for determining a need to hard handoff a mobile communication signal associated with the mobile station from the first communication unit to the second communication unit, the method comprising the steps of:

establishing the mobile communication signal between the first communication unit and the mobile station;

at the second communication unit, receiving a plurality of hard handoff candidate parameters from the first communication unit associated with the mobile communication signal at a handoff scan receiver;

at the handoff scan receiver, the handoff scan receiver being co-located with the second communication unit, collecting a plurality of scan result parameters associated with the mobile communication signal and searching for the mobile station based upon the parameters received;

forwarding the plurality of scan result parameters from the second communication unit to the controller associated with the first communication unit; and determining that a hard handoff of the mobile communication signal is required by the controller based on the scan result parameters.

2. The method according to claim 1, wherein the first communication unit is selected from the group consisting of: a base site, a base site sector, and a satellite base site.

3. The method according to claim 1, wherein the controller comprises a base station controller.

4. The method according to claim 1, wherein the handoff scan receiver is in communication with the controller.

5. The method according to claim 1, wherein the plurality of hard handoff candidate parameters comprises a mobile station unique long code to facilitate mobile station identity, a carrier frequency of the mobile communication signal, and a first time delay interval as measured between the mobile station and the first communication unit.

6. The method according to claim 4, wherein the step of receiving the plurality of hard handoff candidate parameters further comprises:

receiving the plurality of hard handoff candidate parameters at the controller from the first communication unit, and forwarding the plurality of hard handoff candidate parameters to the handoff scan receiver by the first communication unit.

7. The method according to claim 6, wherein the step of forwarding is initiated upon a increase in the first time delay interval to a value above a predetermined threshold.

8. The method according to claim 1, wherein the step of collecting the plurality of scan result parameters further comprises the steps of:

assembling a hard handoff candidate list of local mobile stations based on the hard handoff candidate parameters;

based on the hard handoff candidate list, scanning a plurality of carrier frequencies to identify the mobile station communication signal and its associated carrier frequency; and monitoring the first mobile station communication signal at its associated carrier frequency for a plurality of scan result parameters.

9. The method according to claim 8, wherein the step of scanning further comprises:

tuning to one of the plurality of carrier frequencies; and despreading the plurality of wireless communication signals received in the one of the plurality of carrier frequencies in order to decode the mobile station unique long code associated with the mobile station communication signal.

10. The method according to claim 9, wherein the plurality of mobile scan result parameters comprise the mobile station unique long code, a received signal strength indicator, and a second time delay interval as measured between the first mobile station and the second communication unit.

11. The method according to claim 10, wherein the step of forwarding is initiated upon a decrease in the second time delay interval to a value below a predetermined threshold.

12. The method according to claim 11, wherein the step of determining that a hard handoff is required further comprises the steps of:

comparing the second time delay interval of the mobile station communication signal to a predetermined threshold forming a time delay index;

comparing a received signal strength indicator of the mobile station communication signal to a predetermined signal strength threshold forming a signal strength index; and based on the time delay index and the signal strength index, notifying a second controller that a hard handoff of the mobile station communication signal is required.

13. The method according to claim 1, further comprising the step of performing the hard handoff of the the mobile communication signal from the first communication unit to the second communication unit based on the determination that a hard handoff is required.

14. The method according to claim 13, wherein the step of performing the hard handoff of the mobile station communication signal further comprises the steps of:

notifying the second communication unit to allocate channel resources for the mobile station communication signal;

sending a hard handoff direction message from the controller to the first communication unit;

sending a hard handoff direction message from the first communication unit to the mobile station; and sending a handoff complete message from the mobile station to the second communication unit.

15. A handoff scan receiver for scanning a plurality of wireless communication system signals within a plurality of carrier frequencies in order to determine a need for a hard handoff of a mobile station communication signal from a first communication unit to a second communication unit comprising:

an antenna for receiving the plurality of wireless communication system signals within the plurality of carrier frequencies;

a front end processor, the front end processor tuning to one of the plurality of carrier frequencies in response to a first and second controller input and having as outputs a wideband signal strength measurement of the one of the plurality of wireless communication system signals associated with one of the plurality of carrier frequencies and a digital signal comprised of one of the plurality of wireless communication system signals, the digital signal suitable for despreading;

a channel element processor for
receiving a hard handoff candidate list of mobile station unique long codes including at least the mobile station unique long code associated with the first mobile communication signal,
despreading the digital signal to identify the mobile station unique long code, and
forwarding a signal strength indicator and a time delay associated with the mobile station communication signal via a processor output;

a local scan controller having as inputs a plurality of hard handoff candidate parameters including at least hard handoff candidate parameters forwarded from the first communication unit via a controller, for
providing the hard handoff candidate list of mobile station unique long codes including at least the mobile station unique long code associated with the first mobile communication signal to the channel element processor, and
providing a list of a plurality of scan result parameters to the controller, the list comprising at least the wideband signal strength measurement and the mobile station unique long code and the received signal strength indicator associated with the first mobile station communication signal, the plurality of scan result parameters providing a criteria to the controller to determine that a hard handoff of the first mobile station communication signal is required.

16. The apparatus according to claim 15, wherein the first communication unit is selected from the group consisting of: a base site, a base site sector, and a satellite base site.

17. The apparatus according to claim 15, wherein the controller comprises a base station controller.

18. The apparatus according to claim 15, wherein the handoff scan receiver is in communication with the controller.

19. The apparatus according to claim 15, wherein the front end processor comprises:

a filter for bandpass noise filtering the plurality of wireless communication system signals to form a filtered analog signal;

a first local oscillator—LO—responsive to the controller input for providing a reference frequency output;

a first mixer for mixing the filtered analog signal with the reference frequency output, the first mixer down-converting the frequency of the filtered analog signal to produce an intermediate frequency analog signal;

an amplifier for adding gain and intermediate frequency filtering the intermediate frequency analog signal forming an amplified analog signal;

a quadrature mixer responsive to the second controller input for splitting the amplified analog signal into a first and second quadrature analog signal; and a baseband converter for receiving the first and second quadrature analog signal and having as outputs a wideband signal strength measurement and digital signal.

20. The apparatus according to claim 15, wherein the hard handoff candidate parameters comprise a mobile station unique long code to facilitate mobile station identity, a carrier frequency of the mobile communication signal, and a first time delay interval as measured between the mobile station and the first communication unit.

* * * * *